UNITED STATES PATENT OFFICE.

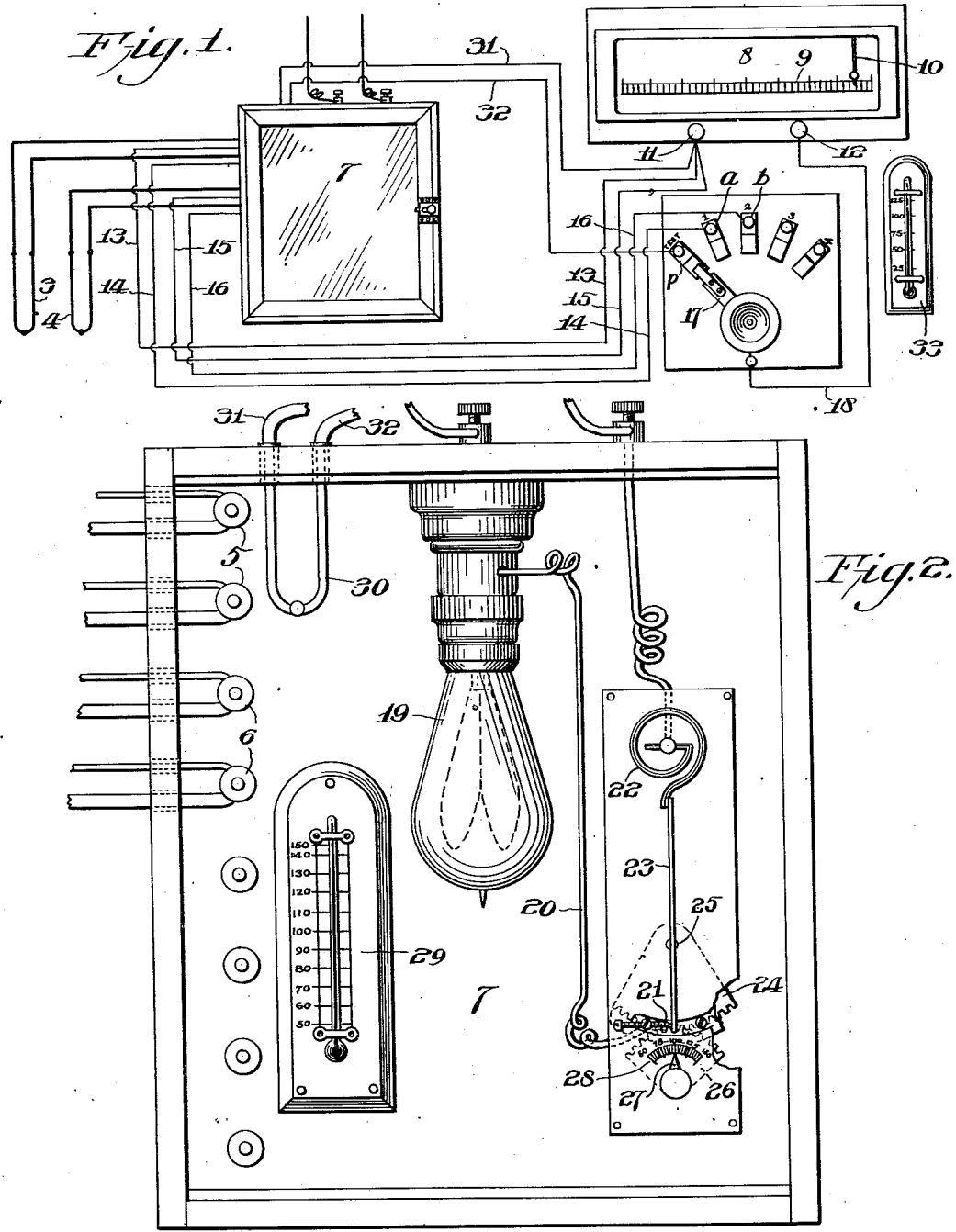

RICHARD P. BROWN, OF PHILADELPHIA, PENNSYLVANIA.

THERMO-ELECTRIC PYROMETER SYSTEM.

1,144,688.  Specification of Letters Patent.  Patented June 29, 1915.

Application filed October 9, 1914. Serial No. 865,814.

*To all whom it may concern:*

Be it known that I, RICHARD P. BROWN, a citizen of the United States, and a resident of the city and county of Philadelphia, State of Pennsylvania, have invented certain new and useful Improvements in Thermo-Electric Pyrometer Systems, of which the following is a specification.

My invention relates to improvements in thermo-electric pyrometer systems and the object of my invention is to furnish an automatic means for maintaining the cold junction of one or more thermo-couples at a certain definite temperature, and also to furnish in connection therewith a means whereby an observer at a distance may be able at any time to ascertain the temperature of the one or more cold junctions without the necessity of visiting the place where the cold junctions are located.

It is well known that a thermo-couple generates a voltage proportional to the difference in temperature of the hot and cold junctions, and it is essential therefore that the cold junction be kept at a constant or known temperature. This cold junction may be at some distance from the thermo-couple by using leads of similar materials to the thermo-couple itself, in which case the cold junction is actually at the end of these special leads.

It has been customary in using thermo-electric pyrometers to either assume or measure with a thermometer, the temperature of the cold junction. This temperature fluctuates with atmospheric changes of temperature and naturally in the vicinity of furnaces operating at high temperatures, these changes of temperature may amount to 100 degrees or more. The cold junction temperature, having been determined, the pointer on the indicating or recording instrument is set to the temperature of the cold junction, say 75° Fahr., when the instrument will read correctly just as long as the temperature of the cold junction remains constant.

My invention consists of a box or case in which a constant temperature can be maintained by means of a thermostat and ordinary incandescent lamp, the thermostatic strip of metal in contracting when the temperature falls below the desired point, completing an electric contact, the circuit being closed and the lamp lighted. Heat given off by the lamp causes the temperature to rise in the box and with a rise of one or two degrees the contact is broken and the light is extinguished. The thermostat having been set to make contact at say 100°, a temperature within one or two degrees of that point can be maintained.

The thermo-couples, of which there may be one or more for indicating or recording the temperature of a furnace or furnaces, are of the usual well known construction, their hot junction being adapted for subjection to heat and the cold junction located within the box above described for maintaining the temperature of the cold junction of each thermo-couple at a constant temperature. One of these boxes which we may call the compensating box may be used with each thermo-couple, or the cold junctions from several thermo-couples may be brought to the one box by using compensating leads composed of the same material as the thermo-couples to transfer the cold junction to the end of these compensating leads.

The compensating box is usually located near the place or places where the temperature is to be measured and from this compensating box are run copper wires to the instrument, frequently located at some distance, on which the temperature is indicated or recorded by the well known form of millivoltmeter. Where more than one thermo-couple is used a switch is installed beside the instrument to permit of selectively connecting the various thermo-couples to the instrument.

In order that the operator of the instrument may know the cold junction temperature in the compensating box without the necessity of visiting this box to observe the temperature on the thermometer mounted therein, I install a thermo-couple in the compensating box and carry the cold junction of this thermo-couple to the indicating or recording instrument, connecting preferably one side of the line through a point on the switch board which can be marked "test". A thermometer should be preferably mounted on or be adjacent to the indicating or recording instrument.

The operation of the system is as follows:—The operator observes the temperature of the thermometer at the indicating or recording instrument, we will assume this temperature to be 75° F. He then adjusts the pointer by the zero adjusting device on the instrument to 75° on the scale. He now closes the switch connecting the test thermo-couple in the compensating box to the instrument and we will assume that the pointer moves up to 100°. This shows that the temperature of the compensating box and that of the cold junctions of the various thermo-couples is 100°. The switch is thrown off and he now adjusts the pointer by the zero adjusting device to 100°, the actual cold junction temperature. The temperature can then be read on the thermo-couple or couples in service with precision.

My invention is illustrated in the accompanying drawings which form part of this specification, in which similar letters of reference indicate similar parts throughout the several views, and in which:—

Figure 1, is a diagrammatic view of my thermo-electric pyrometer system, and Fig. 2, a front elevation of the box for inclosing the cold junctions of the thermo-couples, its front being removed to show the means for maintaining its interior at a constant temperature.

Referring to Fig. 1, 3 and 4 are thermo-couples of usual construction the cold junctions 5—6 of which are placed in a closed box 7. 8 is an indicating or recording instrument of well known construction which is situated at a distance, possibly several hundred feet, from the box 7. This instrument is fitted with the usual scale 9, pointer 10 and binding posts 11—12. To one of the binding posts, as 11, are connected the copper leads 13—15 connected respectively to one side of the cold junctions 5 and 6 of the thermo-couples 3—4. The leads 14—16 connected to the other side of these cold junctions being connected, respectively, to points $a$ and $b$ which, through a switch 17, may be connected one at a time, to a wire 18 which is connected to the binding post 12 of the indicating or recording instrument.

19 is an incandescent lamp, Fig. 2, inside of box 7 one of the line wires 20 of which is connected with a stop 21 adapted to be engaged by an arm 23 of a thermostatic coil 22. The stop 21 is carried upon a toothed segment 24 which is pivoted at 25. 26 is a toothed segment meshing with segment 24 and by rocking this latter segment the former one may be moved so as to move the stop 21 toward or away from arm 23. A pointer 27 carried by the pivot which carries segment 26, operating in connection with a fixed scale 28 will show the position of segment 26 and this scale may be marked so as to indicate degrees of temperature. The stop 21, the coil 22, and arm 23 being set so that at a given temperature, say 100°, the expansion of coil 22 will move arm 23 out of contact with stop 21 the lamp 19 will be extinguished whenever this temperature is reached and will be re-lighted whenever the temperature falls below this limit. In practice the device will maintain the desired temperature within one or two degrees at all times.

A thermometer 29 may be placed within box 7 to show the temperature therein but as it would be inconvenient to the operator or observer, who has the indicating instrument 8 located at a distance, to visit the box 7 to ascertain its temperature, I place within it an auxiliary thermo-couple 30 one of the compensating leads 31 of which is connected to the binding post 11 of the indicating instrument and the other, 32, to the test point $p$ which, through switch 17 and wire 18, may be connected to binding post 12 of instrument 8.

When about to read on the instrument 8 the temperature of any one of the thermo-couples 3—4, the observer first assures himself of the temperature of the room in which the instrument 8 is placed, this he does by an ordinary thermometer 33 near instrument 8. We will assume this temperature is 75°, which therefore is the temperature of the cold junction of the auxiliary thermo-couple 30, and the pointer 10 of instrument 8 will be set by the observer at 75° on scale 9. He now moves switch 17 to contact with test point $p$ when the pointer 10 will move up to the temperature within box 7, say 100°, when the pointer is set to this temperature by the zero adjuster with which most millivolt meters are furnished, it being necessary and well known that the pointer initially should be set at the temperature of the cold junction of the thermo-couple. The pointer having been set at the cold junction temperature the switch is moved to one of the points $a$, $b$, etc., completing upon contact with one of these points the circuit from and some one of the thermo-couples to and through instrument 8 upon the scale 9 of which will be indicated by pointer 10 the degrees of temperature corresponding with the current generated by the couple.

There may be as many separate couples used as may be desired one of the leads from each couple being connected to one of the binding posts of the instrument 8 and the other lead to its own point $a$, $b$, etc., which through switch 17 and wire 18 can be selectively connected to the other binding post of the instrument 8.

Having thus described my invention I claim as new and desire to secure by Letters Patent:—

1. A thermo-electric pyrometer system comprising, in combination, an indicating instrument, a thermo-couple, an inclosed chamber in which is situated the cold junction of said couple, leads connecting said thermo-couple through a switch with said indicating instrument, said switch, a thermostatically controlled means for maintaining said chamber at a substantially uniform temperature, and an auxiliary thermo-couple the hot junction of which is within said chamber and the leads of which are connected through said switch with said indicating instrument.

2. A thermo-electric pyrometer system comprising, in combination, an indicating instrument, a thermo-couple, an inclosed chamber in which the cold junction of said couple is placed, leads detachably connecting the cold junction of said couple and the binding posts of said indicating instrument, an auxiliary thermo-couple the hot junction of which is within said inclosed chamber and the leads of which are adapted to be detachably connected to the binding posts of said indicating instrument, and a thermostatic controlled means for maintaining said inclosed chamber at a substantially constant temperature.

3. A thermo-electric pyrometer system comprising in combination, an indicating instrument, a thermo couple, an inclosed chamber in which is situated the cold junction of said couple, leads detachably connecting the cold junction of said couple and the binding posts of said indicating instrument, an auxiliary thermo-couple the hot junction of which is situated within said inclosed chamber, leads detachably connecting said auxiliary thermo-couple and the binding posts of said indicating instrument, an electric lamp within said inclosed chamber, and a thermostat within said chamber forming part of one of the line wires of said lamp and consisting of a thermostatic coil, an arm carried by said coil, a stop adapted to be engaged by said arm, and a means for adjustably carrying said stop, all substantially as set forth.

RICHARD P. BROWN.

Witnesses:
ROBERT A. ADAMS,
JOHN P. GHEEN.